United States Patent
Zeng et al.

(10) Patent No.: US 12,497,306 B2
(45) Date of Patent: Dec. 16, 2025

(54) ECOLOGICAL SYSTEM FOR DEEP WATER ENVIRONMENT RESTORATION AND CONSTRUCTION METHOD THEREOF

(71) Applicants: Yunnan Huapu Quantum Material Co., Ltd, Yunnan (CN); Chongqing Institute of East China Normal University, Chongqing (CN); East China Normal University, Shanghai (CN)

(72) Inventors: Heping Zeng, Chongqing (CN); Mengyun Hu, Chongqing (CN)

(73) Assignees: YUNNAN HUAPU QUANTUM MATERIAL CO., LTD, Yunnan (CN); CHONGQING INSTITUTE OF EAST CHINA NORMAL UNIVERSITY, Chongqing (CN); EAST CHINA NORMAL UNIVERSITY, Shanghai (CN)

( * ) Notice: Subject to any disclaimer, the term of this patent is extended or adjusted under 35 U.S.C. 154(b) by 699 days.

(21) Appl. No.: 17/855,991

(22) Filed: Jul. 1, 2022

(65) Prior Publication Data
US 2023/0002253 A1    Jan. 5, 2023

(30) Foreign Application Priority Data
Jul. 1, 2021    (CN) .......................... 202110747453.0

(51) Int. Cl.
*C02F 1/30* (2023.01)
*C02F 1/72* (2023.01)
(Continued)

(52) U.S. Cl.
CPC ................ *C02F 1/30* (2013.01); *C02F 1/725* (2013.01); *C02F 3/32* (2013.01); *C02F 2101/30* (2013.01);
(Continued)

(58) Field of Classification Search
CPC .... C02F 1/30; C02F 1/725; C02F 3/32; C02F 2101/30; C02F 2103/007; C02F 2305/10;
(Continued)

(56) References Cited

FOREIGN PATENT DOCUMENTS

| CN | 109824208 A | 5/2019 |
|----|-------------|--------|
| CN | 110803769 A | 2/2020 |

(Continued)

OTHER PUBLICATIONS

JP2011098312 Hideji—Ion adsorption D & M of removing ionic substance (Abstract & MT; May 19, 2011; 13 pages) (Year: 2011).*

(Continued)

*Primary Examiner* — Hayden Brewster
(74) *Attorney, Agent, or Firm* — Hodgson Russ LLP

(57) ABSTRACT

An ecosystem for deep water environment restoration includes: a light-collecting device; an underwater lighting system connected to the light-collecting device and configured to provide light to a deep water layer of a water body; a photocatalytic bionic net comprising a photocatalytic material and a fiber and placed in the deep water layer; and an aquatic plant. When the photocatalytic material receives the light, the photocatalytic material is able to adsorb organic pollutants of the water body to the photocatalytic bionic net and catalyze degradation of the organic pollutants of the water body, concentrate microorganisms to allow the microorganisms to decompose the organic pollutants into nutrients required for growth of the aquatic plant, and absorb the light to catalyze decomposition of water to produce oxygen. When the aquatic plant receives the light, the aquatic plant is able to perform photosynthesis to release oxygen.

19 Claims, 2 Drawing Sheets

(51) Int. Cl.
  *C02F 3/32* (2023.01)
  *C02F 101/30* (2006.01)
  *C02F 103/00* (2006.01)

(52) U.S. Cl.
  CPC .... *C02F 2103/007* (2013.01); *C02F 2305/10* (2013.01)

(58) Field of Classification Search
  CPC .......... C02F 2201/009; C02F 2203/006; C02F 3/327; C02F 3/34; Y02W 10/37
  USPC ....................................................... 210/602
  See application file for complete search history.

(56)     References Cited

FOREIGN PATENT DOCUMENTS

| | | | | |
|---|---|---|---|---|
| JP | 2011098312 A | 5/2011 | | |
| WO | WO-2012107748 A1 * | 8/2012 | ............ | C12M 21/02 |

OTHER PUBLICATIONS

CN205635083U Fu et al.—Ion Water-based Light Pipe (MT and Abstract; Oct. 12, 2016) (Year: 2016).*
CN109824208A Qui Jian—Ion Composite type river ecological restoration (Abstract & MT; May 31, 2019) (Year: 2019).*
CN110803769A Pan et al.—Ion Black and odorous water treatment system (Abstract & MT; Feb. 18, 2020; 15 pages) (Year: 2020).*
CNIPA, First Office Action for CN Application No. 202110747453. 0, Apr. 19, 2022.

* cited by examiner

ECOLOGICAL SYSTEM FOR DEEP WATER ENVIRONMENT RESTORATION AND CONSTRUCTION METHOD THEREOF

CROSS-REFERENCE TO RELATED APPLICATION

This application claims priority to Chinese Patent Application No. 202110747453.0, filed Jul. 1, 2021, the entire disclosure of which is incorporated herein by reference.

TECHNICAL FIELD

The present disclosure relates to a field of water environment restoration, and particular to an ecosystem for deep water environment restoration and a construction method thereof.

BACKGROUND

With the advancement of society and the improvement of people's living standards, the discharge of domestic sewage and industrial wastewater has been increased rapidly. As a result, muddy and odorous water bodies such as in rivers are gradually increased, and organic pollution in the water body is accumulated. A common method for treating the water pollution is to build a sewage treatment plant. The pollution of lakes and rivers and other water bodies is usually treated in situ. The sewage treatment plant may be effective, but the investment is relatively high.

In recent years, water environment restoration devices that utilize plants or chemical agents may be used to treat pollutants of the water body, however they can only deal with the pollutants on the water surface and in the shallow water layer that is reached by sunlight. Therefore, the related art has the following problems. In the existing ecological water environment restoration, it is difficult to decontaminate the water body of the deep water environment. Moreover, in the existing technology, it is difficult to achieve comprehensive treatment and decontamination of eutrophic water bodies and industrial wastewater-polluted water bodies. The cost for the treatment and decontamination is high, and the process thereof is complicated.

SUMMARY

Accordingly, to solve at least one of the problems that exist in the related art to at least some extent, the present disclosure provides an ecosystem for deep water environment restoration and a method for constructing such an ecosystem.

In a first aspect of the present disclosure, an ecosystem for deep water environment restoration includes: a light-collecting device; an underwater lighting system connected to the light-collecting device and configured to provide light to a deep water layer of a water body; a photocatalytic bionic net comprising a photocatalytic material and a fiber and placed in the deep water layer; and an aquatic plant. When the photocatalytic material receives the light, the photocatalytic material is able to adsorb organic pollutants of the water body to the photocatalytic bionic net and catalyze degradation of the organic pollutants of the water body, concentrate microorganisms to allow the microorganisms to decompose the organic pollutants into nutrients required for growth of the aquatic plant, and absorb the light to catalyze decomposition of water to produce oxygen. When the aquatic plant receives the light, the aquatic plant is able to perform photosynthesis to release oxygen.

In some embodiments, the photocatalytic bionic net includes a first photocatalytic bionic net placed in the deep water layer and a second photocatalytic bionic net placed on a surface of the water body.

In some embodiments, the light-collecting device is a solar panel and is configured to convert the light into an electric energy for the underwater lighting system.

In some embodiments, the underwater lighting system is an LED light strip and is arranged, in a winding manner, on the photocatalytic bionic net.

In some embodiments, the underwater lighting system is a bunching light-guiding rod.

In some embodiments, the bunching light-guiding rod comprises a plurality of rods spaced apart from each other.

In some embodiments, the photocatalytic bionic net is provided with a load balancer to arrange the photocatalytic bionic net to a preset level of the water body.

In some embodiments, the photocatalytic material is able to adsorb a light with a wave length of 200 to 1200 nm.

In some embodiments, the photocatalytic material comprises at least one selected from a composite material of mesoporous graphene and a mesoporous photocatalyst, mesoporous titanium dioxide, a composite material of mesoporous titanium dioxide and graphene, a composite material of mesoporous titanium dioxide and graphitic carbon nitride, a composite material of mesoporous titanium dioxide and a molecular sieve, a composite material of mesoporous titanium dioxide and an organic metal framework material, a composite material of mesoporous titanium dioxide and zinc oxide, a composite material of mesoporous titanium dioxide and iron trioxide, a composite material of mesoporous titanium dioxide and molybdenum disulfide, a composite material of mesoporous titanium dioxide and silver nitrate, a composite material of mesoporous titanium dioxide and a bismuth-based photocatalyst, a composite material of mesoporous titanium dioxide and tungsten oxide, a composite material of mesoporous titanium dioxide and tin oxide, a composite material of mesoporous titanium dioxide and cadmium sulfide, a composite material of mesoporous titanium dioxide and zirconium dioxide, metal-doped mesoporous titanium dioxide, titanium dioxide self-doped by oxygen vacancies, a composite material of mesoporous titanium oxide and a photocatalyst self-doped by oxygen vacancies, and titanium oxide self-doped by titanous.

In some embodiments, the photocatalytic material is titanium dioxide, a composite material of titanium dioxide and graphene, a composite material of titanium dioxide and a molecular sieve, or any combination thereof.

In some embodiments, the photocatalytic bionic net further comprises a conductive carbon electrode material.

In some embodiments, the conductive carbon electrode material comprises at least one selected from graphene, conductive carbon black, carbon nanotube, carbon quantum dots, activated carbon, conductive graphite, conductive metal organic framework, gold nanopowder, silver nanopowder, copper nanopowder and any combinations thereof.

In some embodiments, the aquatic plant comprises at least one selected from vallisneria, polygonaceae, bengal waterdropwort herb, hydrilla, mimulicalyx, lotus, *Zantedeschia hybrida, Potamogeton pectinatus, Potamogeton malaianus*, ottelia, orchid, *Cyperus altrnlifolius*, iris and any combination thereof.

In a second aspect of the present disclosure, a method for constructing an ecosystem for deep water environment restoration includes: cleaning up a floating object on a surface of a water body; providing a light-collecting device and an underwater lighting system connected to the light-collecting device and configured to provide light to a deep water layer of the water body; placing a photocatalytic bionic net comprising a photocatalytic material and a fiber in the deep water layer; and growing an aquatic plant in the water body. When the photocatalytic material receives the light, the photocatalytic material is able to adsorb organic pollutants of the water body to the photocatalytic bionic net and catalyze degradation of the organic pollutants of the water body, concentrate microorganisms to allow the microorganisms to decompose the organic pollutants into nutrients required for growth of the aquatic plant, and absorb the light to catalyze decomposition of water to produce oxygen. When the aquatic plant receives the light, the aquatic plant is able to perform photosynthesis to release oxygen.

In some embodiments, the photocatalytic material is a composite material of graphene and titanium dioxide, and is prepared by: mixing metatitanic acid and sulfuric acid to prepare a titanyl sulfate solution; mixing the titanyl sulfate solution and graphene to prepare a mixture solution; adding an alkaline substance into the mixture solution to prepare a precipitate of titanium hydroxide; washing and drying the precipitate and heating the precipitate to obtain photocatalytic particles having a shell-core structure with a graphene core and a titanium dioxide shell as the photocatalytic material.

In some embodiments, a mass content of the metatitanic acid in the titanyl sulfate solution is in a range of 40% to 50%.

In some embodiments, a mass ratio of metatitanic acid to sulfuric acid is in a range of 1:1 to 1:10.

In some embodiments, a mass ratio of titanyl sulfate to graphene is in a range of 1:1 to 1:1000.

In some embodiments, the alkaline substance comprises at least one selected from ammonia, sodium hydroxide, and calcium hydroxide, and a mass ratio of the alkaline substance to titanyl sulfate is in a range of 1:1 to 1:10.

In some embodiments, the photocatalytic bionic net is prepared by providing a fiber rope, and compounding the photocatalytic material with the fiber rope to obtain a photocatalytic bionic rope, and weaving the photocatalytic bionic net by the photocatalytic bionic rope.

In some embodiments, the photocatalytic bionic net is added with a conductive carbon electrode material by mixing the conductive carbon electrode material with an adhesive to prepare a conductive carbon electrode material slurry; mixing the photocatalytic bionic rope and the conductive carbon electrode material slurry under mechanical stirring for 1 to 24 h; and drying the photocatalytic bionic rope in an air atmosphere at a temperature of 50 to 90° C. for 1 to 24 h.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
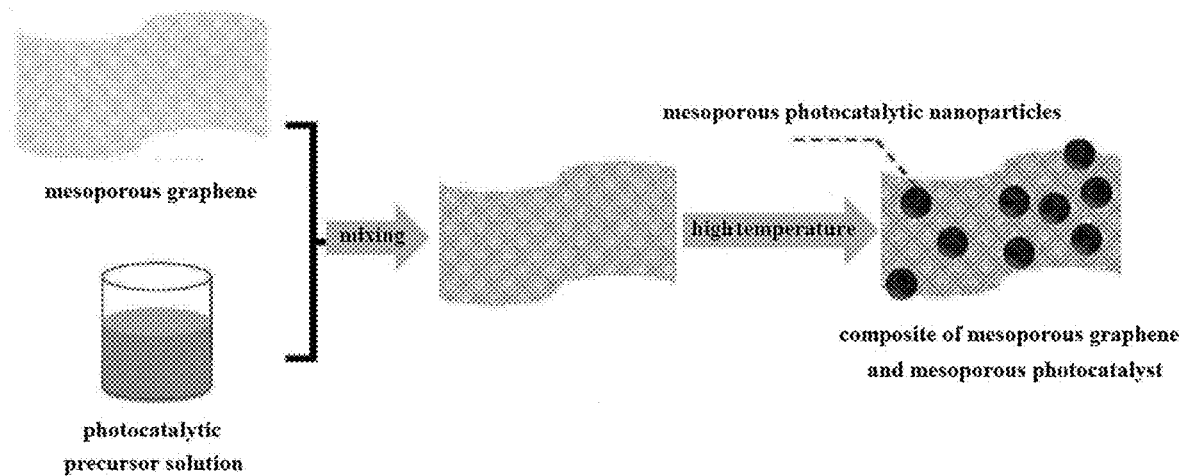
FIG. 1 is a schematic diagram showing preparation of a composite material of mesoporous graphene and a mesoporous photocatalyst according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

The present disclosure provides an ecosystem for deep water environment restoration and a method for constructing such an ecosystem.

The ecosystem includes an underwater lighting system, a photocatalytic bionic net and an aquatic plant. The photocatalytic bionic net made of a photocatalytic material is used to absorb light generated from the underwater lighting system, and continuously adsorb and degrade pollutants. The photocatalystic bionic net can be used to collect microorganisms, and decompose the organic pollutants in the water body into nutrients for the growth of the aquatic plant by the microorganisms. The aquatic plant performs photosynthesis by underwater light and grow. The system utilizes the photocatalytic material that can respond to the visible light to enable the natural restoration of the water environment to decontaminate the water body and restore ecology.

In the embodiments of the present disclosure, an ecosystem for deep water environment restoration is provided, including an underwater lighting system, a photocatalytic bionic net and an aquatic plant. The underwater lighting system is connected with a light-collecting device, and the light-collecting device is configured to collect light and transmit the collected light to a deep water layer to supply the collected light to the underwater lighting system. The photocatalytic bionic net is placed on a surface and in the deep water layer of the water body, the photocatalytic bionic net is interwoven by a photocatalytic bionic rope, and the photocatalytic bionic rope includes a photocatalytic material and a fiber.

The photocatalytic material has a photocatalytic function and an adsorption function. Under a lighting condition, the photocatalytic material adsorbs and degrades pollutants of the water body, concentrates the microorganisms and decomposes, by the microorganisms, organic pollutants into nutrients required for the growth of the aquatic plant, and absorb the light to split water to produce oxygen for promoting the reproduction of the microorganisms, thus improving the decontamination of the water body and increasing a transparency of the water body and a depth that the light can reach. Further, under the lighting condition, the aquatic plant performs photosynthesis to release oxygen and thus increase a concentration of dissolved oxygen in the water body and promote the decontamination of the water body.

In some embodiments, the photocatalytic material includes at least one selected from a composite material of mesoporous graphene and a mesoporous photocatalyst, mesoporous titanium dioxide, a composite material of mesoporous titanium dioxide and graphene, a composite material of mesoporous titanium dioxide and graphitic carbon nitride, a composite material of mesoporous titanium dioxide and a molecular sieve, a composite material of mesoporous titanium dioxide and an organic metal framework material, a composite material of mesoporous titanium dioxide and zinc oxide, a composite material of mesoporous titanium dioxide and iron trioxide, a composite material of mesoporous titanium dioxide and molybdenum disulfide, a composite material of mesoporous titanium dioxide and silver nitrate, a composite material of mesoporous titanium dioxide and a bismuth-based photocatalyst, a composite material of mesoporous titanium dioxide and tungsten oxide, a composite material of mesoporous titanium dioxide and tin oxide, a composite material of mesoporous titanium dioxide and cadmium sulfide, a composite material of mesoporous titanium dioxide and zirconium dioxide, metal-doped mesoporous titanium dioxide, titanium dioxide self-doped by oxygen vacancies, a composite material of mesoporous titanium oxide and a photocatalyst self-doped by oxygen vacancies, titanium oxide self-doped by titanous, and any combinations thereof. For example, the photocatalytic material may be titanium dioxide, a composite material of titanium dioxide and graphene, a composite material of titanium dioxide and a molecular sieve, or any combination thereof.

In some embodiments, the composite material of mesoporous graphene and the mesoporous photocatalyst is prepared as follows. Metatitanic acid is used as a titanium source to be mixed and reacted with sulfuric acid to prepare a titanyl sulfate solution. The titanyl sulfate solution is added with mesoporous graphene, thereby obtaining a mixture solution. The titanyl sulfate solution rapidly diffuses into pores of mesoporous graphene due to hydrophilicity of the surface of mesoporous graphene, to obtain mesoporous graphene coated with titanyl sulfate. An alkaline substance is further added to react with titanyl sulfate on the surface of mesoporous graphene to form a shell-core structure material with a titanium hydroxide shell and a mesoporous graphene core. Subsequent processes of solid-liquid separation, washing and drying are performed, and the precipitated product is calcined at a high temperature to obtain photocatalytic powders having the shell-core structure with the porous core and the mesoporous quantum titanium oxide shell. The so-called precipitation and self-assembly process refers to a process where the alkaline substance diffuses into the pores of mesoporous graphene and reacts with titanyl sulfate to form titanium hydroxide. Titanium hydroxide is subjected to a high temperature annealing and spontaneously spreads and grows from the inside of mesoporous graphene to outside. Due to the local high pressure and high temperature and the gas diffusion in the pores, the mesoporous quantum titanium oxide is grown in the pores, and the gas continues to diffuse to the surface of mesoporous graphene, bringing the titanium hydroxide to form the mesoporous quantum titanium oxide shell (i.e., self-assembly). Mesoporous graphene is coated by the mesoporous quantum titanium oxide from the inside to the outside.

In some embodiments, metatitanic acid and sulfuric acid are mixed to prepare the titanyl sulfate solution. In this operation, a mass content of metatitanic acid is in a range of 40% to 50% based on a mass of the titanyl sulfate solution, a molar mass ratio of metatitanic acid to sulfuric acid is in a range of 1:1 to 1:10, and a mixing time of metatitanic acid and sulfuric acid is in a range of 0.1 to 24 h. A reaction that takes place in this operation has a formula of

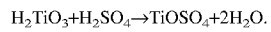

The titanyl sulfate solution and mesoporous graphene are mixed to prepare the mixture solution. In this operation, a mass ratio of titanyl sulfate to mesoporous graphene is in a range of 1:1 to 1:1000, and a mixing time of titanyl sulfate and mesoporous graphene is in a range of 0.1 to 24 h, a depth of the pore into which titanyl sulfate diffuses is in a range of 1-2 μm, a diffusion temperature of titanyl sulfate in mesoporous graphene is in a range of 80 to 400° C., a heating rate of the diffusion of titanyl sulfate in mesoporous graphene is in a range of 2-10° C./min, and a pressure of the diffusion of titanyl sulfate in mesoporous graphene is in a range of 0-30 bar. A reaction that takes place in this operation has a formula of

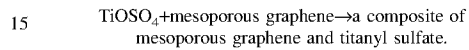

The alkaline substance is added into the mixture solution to prepare the precipitate of titanium hydroxide. In this operation, a mass ratio of the alkaline substance to titanyl sulfate is in a range of 1:1-1:10, and a mixing time of titanyl sulfate and alkaline material is in a range of 0.1-24 h. The alkaline substance includes ammonia, sodium hydroxide, and calcium hydroxide. Mesoporous graphene has a pore size ranging from 2 to 20 nm. A reaction that takes place in this operation has a formula of

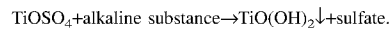

The precipitate is separated, washed, dried, and then calcined at a high temperature to obtain photocatalytic particles having the shell-core structure with the mesoporous graphene core and the mesoporous quantum titanium oxide shell. In this operation, a temperature of the self-assembly of titanium hydroxide to produce mesoporous quantum titanium oxide is in a range of 60 to 1200° C., and an annealing time of the self-assembly of titanium hydroxide is in a range of 0.5-48 h, and thus the material having the porous core and mesoporous quantum titanium oxide is produced. The obtained material having the porous core and mesoporous quantum titanium oxide shell has a specific surface area of 200 to 300 m²/g, and a pore volume of 0.1 to 2 cm³/g. A reaction that takes place in this operation has a formula of

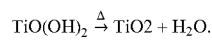

In some embodiments, the composite material of mesoporous graphene and the mesoporous photocatalyst absorb a light having a wave length of 200 to 1200 nm. Mesoporous graphene has a high adsorption capacity and can quickly adsorb a large amount of the organic pollutant (adhered to the surface of graphene). The mesoporous photocatalyst on the surface of graphene can be used to photocatalytically decompose the adsorbed organic pollutants.

The photocatalytic material has a synergistic effect with the microorganisms (bionic bacteria). Specifically, the photocatalytic splitting of water produces oxygen to promote the reproduction of microorganisms, especially the reproduction of aerobic microorganisms and facultative microorganisms. The microorganisms can accelerate the decomposition of the organic substances and further improve the photocatalysis.

In some embodiments, a conductive carbon electrode material is added to the photocatalytic bionic rope, and a voltage can be generated by an electric energy to improve the adsorption.

The conductive carbon electrode material includes at least one selected from graphene, conductive carbon black, carbon nanotube, carbon quantum dots, activated carbon, conductive graphite, conductive metal organic framework, gold nanopowder, silver nanopowder, copper nanopowder and any combinations thereof.

The conductive carbon electrode material is added into the photocatalytic bionic rope by the specific operations as follows.

The conductive carbon electrode material is mixed with an adhesive to prepare a conductive carbon electrode material slurry. The conductive carbon electrode material has a size of 10 to 1000 nm. The adhesive is polyacrylate. A mass ratio of the conductive carbon electrode material to the adhesive is in a range of (1-100):(1-100).

The photocatalytic bionic rope and the conductive carbon electrode material slurry are mixed and stirred mechanically for 1 to 24 h.

The dehydration and drying treatment is performed in an air atmosphere, a drying time is in a range of 1 to 24 h, and a drying temperature is in a range of 50 to 90° C. The photocatalytic bionic rope material coated with the conductive carbon electrode material is prepared.

In some embodiments, the underwater lighting system is an underwater LED light strip, the light-collecting device is a solar panel, the underwater LED light strip is connected to and powered by the solar panel, and the underwater LED light strip is arranged, in a winding manner, on the photocatalytic bionic net.

In some embodiments, the underwater lighting system is an underwater bunching light-guiding rod.

In some embodiments, the photocatalytic bionic net is provided with a load balancer to make the net sink into a desired level of the water body, for example into the bottom of the water body.

In some embodiments, the photocatalytic bionic net has square meshes. Further, a size of the net or the mesh can be adjustable.

In some embodiments, the aquatic plant includes at least one selected from vallisneria, hydrilla, *Potamogeton pectinatus, Potamogeton malaianus*, ottelia, orchid, *Cyperus altrnlifolius* and iris.

In embodiments of another aspect of the present disclosure, a method for constructing an ecosystem for deep water environment restoration is provided, including: (i) cleaning up floating plants, animal remains, and rubbish; (ii) coating and compounding the photocatalytic material to a fiber net to obtain a photocatalytic bionic net, and adding a load balancer to each of the four corners of the photocatalytic bionic net in such a way that the photocatalytic bionic net sinks into the bottom of the water body (or the deep water layer); and (iii) introducing the light source and growing the aquatic plant in the deep water layer. The light source is introduced in the deep water layer by using the light-collecting device transmit the light collected to the underwater lighting system in the deep water layer, to allow the light to reach the photocatalytic bionic net in deep water layer. Under the lighting condition, the photocatalytic material of the photocatalytic bionic net adsorbs and degrades the water pollutants, enriches the microorganisms and decomposes the organic pollutants by the microorganisms into nutrients required for the growth of the aquatic plant. The aquatic plant performs photosynthesis under the lighting condition to release oxygen and thus increase the concentration of dissolved oxygen in the water body. Therefore, the ecosystem for deep water environment restoration is constructed.

The principle of the present disclosure is explained below to help the understanding of the present disclosure.

The present ecosystem is suitable for the deep water environment restoration. By combining the underwater lighting module, the photocatalytic bionic net and the aquatic plant, the present ecosystem is capable of restoring a water ecology, in which technologies of mesoporous adsorption and photocatalysis are used.

Firstly, the underwater light module/device/system adopts a solar-driven LED light strip or a bunching light-guiding rod to guide the light into the deep water layer. It should be noted that the light source can be located at any position or depth of the water body, for example at the bottom or the deep water layer of the water body.

Secondly, the photocatalytic material (e.g., the composite material of mesoporous graphene and the mesoporous photocatalyst) which is responsive to the visible light is coated on the surface of the fiber net to form the photocatalytic bionic net, which is placed under water to catalyze the self-decontamination of the water body. The photocatalyst has a mesoporous structure, and is coated on and embedded in graphene. That is, the photocatalyst is used to form the composite material with the mesoporous material with a large specific surface area, and the composite material has an improved underwater adsorption performance. The light source provided by the underwater lighting system can be used for catalyzing the regeneration of the adsorption capacity of the mesoporous material, that is, for maintaining the adsorption activity of the mesoporous material. Further, the underwater light source can enhance the photosynthesis of the aquatic plants and promote the reproduction of microorganisms. The photocatalytic material absorbs the light energy provided by the underwater lighting system. The photocatalytic material can continuously adsorb and degrade the water pollutants, and enrich the microorganisms and decompose the organic pollutants into nutrients for the growth of the aquatic plant (including underwater plants and surface plants). The underwater plant may perform photosynthesis by the underwater light source and thus the growth is improved.

Finally, the system utilizes the photocatalytic material that can respond to the visible light to enable the natural restoration of the water environment to decontaminate the water body and restore the water ecology.

In order to facilitate the understanding of the present disclosure, the technical means of the present disclosure is further described below.

(I) Photocatalytic Water Decontamination by Using the Photocatalytic Material

Under the lighting condition, the photocatalytic material produce extremely active hydroxyl radicals and superoxide radicals, which can decompose the organic substances. The organic substance in water and air may be directly decomposed into water and carbon dioxide. Meanwhile, the photocatalysis can split water to produce oxygen. The use of environmentally friendly photocatalysis technology for water decontamination will not cause the secondary pollution to the water body. However, the traditional commercial photocatalytic materials require ultraviolet light and have almost no response to the visible light. It is known that more than 90% of the sunlight is visible light and near-infrared light. Through a lot of researches, the inventors of the present disclosure find that the photocatalytic material (e.g., the composite material of mesoporous graphene and a mesoporous photocatalyst) is responsive to the visible light and can absorb light having a wave length of 200 to 1200 nm (commercial titanium oxide only absorbs ultraviolet light of <400 nm), and thus the photocatalytic material of the present disclosure can realize the efficient absorption and the utilization of the solar energy. The photocatalytic material is coated on the fiber net to make each fiber filament/rope of the net have high catalytic activity. For the photocatalytic material, physical/chemical adsorption and photocatalysis are applied. The mesoporous material has a strong adsorption capacity and can effectively capture various organic pollutants, heavy metal ions, phosphorus, iron and manganese in the water body. The captured organic pollutants are decomposed into water and carbon dioxide by the photocatalysis, and heavy metal ions, phosphorus, iron and manganese are effectively adsorbed, mineralized and removed from the water body. Meanwhile, the photocatalysis may decompose water to produce oxygen, to increase the concentration of the dissolved oxygen in the water body and promote the self-decontamination of the water body.

The photocatalytic bionic net sinks and spreads at a preset level of the water body, for example at the bottom or in the deep water layer, to realize the sewage decontamination under the light irradiation (i.e., the lighting condition). Meanwhile, the water body can be purified or decontaminated in the following aspects. In a first aspect, indexes of the water body are improved. The excess organic substances in the water body is rapidly decomposed, chemical oxygen demand (COD), permanganate index, ammonia nitrogen index and total phosphorus index of the water body are reduced. In a second aspect, the physical condition of the water body is improved. Algae microorganisms are reduced and the transparency of the water body is improved. In a third aspect, the ecological environment is improved. The concentration of the dissolved oxygen of the water body is improved, and the metabolism of the water ecosystem is promoted.

(II) Growth of the Aquatic Plant under Synergistic Effect of Photosynthesis and Photocatalysis The aquatic plants, such as vallisneria, polygonaceae, bengal waterdropwort herb, hydrilla, mimulicalyx, lotus, iris, *Zantedeschia hybrida, Potamogeton pectinatus, Potamogeton malaianus*, ottelia, orchid and *Cyperus altrnlifolius*, can build a three-dimensional forest in the water body and provide for lives of fishes, mussels, snails and other aquatic organisms, to reach a good ecological balance of the water body. Therefore, the water body can be decontaminated and the secondary pollution to water body can be avoided.

The photocatalytic bionic net, the aquatic plants and the microorganisms may have a synergistic effect in the decontamination of the water body under the lighting condition provided by the LED light strip and/or the bunching light-guiding rod. The underwater LED light strip or the bunching light-guiding rod is used as the light sources in the deep water layer to provide enough light for the growth of the aquatic plants and the microorganisms, thus solving the problem of poor light transmission of the black, odorous and polluted water body. The aquatic plants perform the photosynthesis in the water body to produce oxygen, which can further improve the growth of the aquatic plant themselves and also provides oxygen for the microorganisms and other aquatic lives like fishes. The photocatalytic bionic net is used to catalyze the photocatalytic reaction(s) to provide nutrients for the growth of aquatic plants and microorganisms. Moreover, the net itself can be used as a good habitat for the microorganisms. The photocatalytic material of the photocatalytic bionic net under the lighting condition of the LED light strip or the bunching light-guiding rod produces extremely active hydroxyl radicals and superoxide radicals, which can decompose the organic substances in the water body into water and carbon dioxide. Meanwhile, water can be split by the photocatalysis to produce oxygen. The photocatalytic bionic net can effectively adsorb and mineralize heavy metal ions, phosphorus, iron, and manganese, and carry these pollutants out off the water body, thus reducing the metal ion pollution of the water body. In addition, the conductive carbon electrode material is added to the photocatalytic bionic net to utilize the electric energy generated by the solar energy through the solar photovoltaic panel, and thus a voltage is applied to the photocatalytic bionic net to make it an electrochemical adsorption material, maintaining a long-term adsorption activity and improving an adsorption saturability of the photocatalytic bionic net.

In some embodiments, the aquatic plant is selected as vallisneria, polygonaceae, or bengal waterdropwort herb.

Vallisneria can increase the density of sediments. Vallisneria roots absorb water of the bottom sludge (i.e., the sediments), reducing the water content of the bottom sludge can effectively reduce the mobility of the sediments and inhibit the suspension of black and odorous substances, so as to improve the transparency of the water body. Further, vallisneria absorb substances such as phosphorus and nitrogen in the water body, and achieve the synergistic effect with the microorganisms to restore the water ecological environment. In addition, vallisneria secrete substances that inhibit the growth of algae and destroy the physiological metabolism of the algae, and thus ultimately cause the death of algae in a large area in the water body like the river, minimize the pollution of the water body caused by toxins produced by the algae, and improve the eutrophication situation of the water body. Vallisneria is a submerged plant, and can grow with symbiotic bacteria, resulting in an increase of the oxygen content in the water body and an increase of a speed of water ecological restoration.

Polygonaceae (also called *Azolla filliculoidas*) is a high-protein, high-nutrient, high-yield, high-benefit plant. It is a natural green manure and can be used to improve saline-alkali land and sandy wasteland. It contains various beneficial elements, such as β-carotene, chlorophyll, emodin, isoflavones, SOD, selenium, potassium, calcium, iron, zinc, phosphorus and magnesium, and thus provides nutrient elements needed by lives in the water body. It can be applied in diversified fields such as food, medicine, fertilizer, soil improvement, and environmental protection.

Bengal waterdropwort herb has a developed root system and a strong adaptability, which can effectively improve water quality via the processes of degradation/decomposition and photosynthesis in the eutrophic water body. Bengal waterdropwort herb can help the water environment treatment through enrichment, absorption and transfer processes. Bengal waterdropwort herb grows on the water surface and has dense roots, forming a natural bionic filter, which reduces a water flow rate, facilitates the sedimentation of suspending solids, and provides a substrate and habitat for the microorganisms. The large roots provide a large area for adsorbing zoogloea, thus realizing a physical filtration function. Meanwhile, the growth of bengal waterdropwort herb needs various nutrients, so it will absorb a certain amount of nutrients such as nitrogen and phosphorus in water body and the sediments. Since bengal waterdropwort herb can be harvested in multiple times within a year, the elements adsorbed by bengal waterdropwort herb can be taken away, thereby improving the water restoration.

(III) Underwater Photocatalytic Reaction Promoting the Reproduction of the Microorganisms in the Water Body Under the irradiation of the light, the underwater microorganisms absorb the nutrients produced by the photocatalytic bionic net to promote the reproduction of the microorganisms. The microorganisms can decompose the organic pollutants into simple and stable inorganic substances such as carbon dioxide and water and reduce the COD, ammonia nitrogen index, total phosphorus index of the water body. In the case where the light reaches the sludge on the bottom of the water body, the rapid reproduction of microorganisms in the sludge can be realized to decontaminate the bottom sludge and improving the clarity of the water body. A dynamic change of the dissolved oxygen in the water body can reflect the treatment process of the organic pollutants in the water body, and thus is used as an indicator of the decontamination of the water body.

The photocatalytic bionic net functions synergistically with the microorganisms in the decomposition of the organic substances and the increase of the dissolved oxygen. Moreover, the photocatalytic bionic net is a good substrate for breeding the microorganisms, and thus can improve the reproduction of the microorganisms. In addition, for anaerobic microorganisms, the organic substances in the water body or produced by the photocatalytic decomposition can support the reproduction of the anaerobic microorganisms. In this system, both anaerobic and aerobic microorganisms can live. The microorganisms can quickly decompose the organic substances adsorbed on the surface of the photocatalytic bionic net and accelerate the photocatalytic decomposition. The photocatalytic bionic net functions with the aquatic plants to restore the growth environment of plants and animals in the water. While the aquatic plants grow smoothly, the aquatic plants will continue to improve the light transmittance of the water body and reduce the organic substances in the water. With the increase of the visibility and light transmittance of the water body, the photocatalytic bionic net receives more light, which promote the photocatalytic reactions. Under the lighting condition, the photocatalytic biomimetic net, the aquatic plants, and the microorganisms are coordinated to activate the automatic restoration of the water body to achieve the long-term ecological governance.

The photocatalytic bionic net is coated with the mesoporous material having a large specific surface area, which can adsorbs the organic substances and the microorganisms, and is beneficial to the growth and the reproduction of the microorganisms. Specifically, by absorbing the light energy, the photocatalytic bionic net decomposes the algae and the organic substances adsorbed on the surface of the net, and thus provides the microorganisms growing on or inside the graphene mesoporous quantum material with nutrients and breeding places and promotes the reproduction of the microorganisms. The growth and reproduction of the microorganisms will inhibit the growth of algae and decompose the organic substances, so as to quickly remove the algae on the surface of the photocatalytic bionic net, increase the light irradiation range of the photocatalytic bionic rope, and increase a contact area between the photocatalytic bionic net and the organic substance. In this case, the photocatalytic bionic net has a high adsorption capacity and is able to maintain the decomposition function in the water body.

(IV) Biodiversity Wetland Construction and Water Quality Natural Filtration and Purification The technical solutions of the present disclosure can be used for construction of biodiversity wetlands. The present composite material of the photocatalytic material, graphene, carbon-based adsorption material, the three-dimensional mesoporous material or the surface polar oxide has a large specific surface area and a strong adsorption function. The adsorption function can be maintained and regenerated by the photocatalysis. The present material can perform and improve the restoration of the wetlands to form a wetland landscape.

The surface polar oxides can inactivate blue algae and the mesoporous materials can absorb the organic components such as proteins and amino acids of blue algae as organic fertilizers for wetland plants, to enrich the natural microorganism of the wetland and degrade/decompose the pollutants of the water body into organic nutrients. On this basis, a natural virtuous cycle of wetland ecology can be generated, to achieve the purpose of wetland management and decontamination of the water body.

The mesoporous adsorption of the present material can be regenerated by the photocatalysis to maintain the material at a high level of mesoporous adsorption activity/capacity. With the mesoporous adsorption, absorption of the aquatic plants and the microorganisms, and the formed bionic community, nitrogen, phosphorus, heavy metals and other pollutants in the water body can be decomposed or stored by the plants through a series of physical/chemical changes or through bionic transfers, and thus are removed from the water body. Meanwhile, the aquatic plants can release oxygen to the water body through the photosynthesis, forming an active bionic ecological environment, and promoting the catabolism of the microorganisms in the root zone of the aquatic plants.

The present disclosure has the following beneficial effects.

In the ecosystem of the present disclosure is suitable for the deep water environment restoration. By combining the underwater lighting system, the photocatalytic bionic net and the aquatic plant, the photocatalytic material of the photocatalytic bionic net is used to absorb the light energy from the underwater lighting system, continuously absorb and degrade the pollutants in the water body, enrich the microorganisms, and decompose the organic pollutants in water body into nutrients for the growth of the aquatic plant(s). The aquatic plant performs the photosynthesis by the underwater light and grows. The present system utilizes the photocatalytic material that can respond to the visible light to enable the natural restoration of the water environment to decontaminate the water body and restore ecology. The photocatalytic bionic net can be used as a water purification system with a large specific surface area, and has the functions of rapidly adsorbing algae, total phosphorus, and organic substances of the water body, and degrading these pollutants through the photocatalysis. The light (sunlight) provides energy for the photocatalysis. Organic substances such as common blue algae, green algae, brown algae and other organic matters are adsorbed on the surface of the photocatalytic bionic net and are degraded/decomposed into water and carbon dioxide without providing any new pollutants. Further, the photocatalytic bionic net can absorb light energy and be used to decompose water to produce oxygen. A large amount of newly produced oxygen can support lives such as fishes and shrimps, and promote the reproduction of the surrounding aquatic plants to achieve a dynamic balance of the aquatic ecology. In addition, the photocatalytic bionic net includes two photocatalytic bionic nets, one is arranged in the deep water layer of the water body to realize the decontamination of the water body, and the other one is arranged on the surface of the water body. In this way, the surface of the water body can become clean and transparent by the present ecosystem with the photocatalytic bionic net which is driven by the light. Moreover, the photocatalytic bionic net may include more than two, each photocatalytic bionic net can be located in any suitable position and depth of the water body.

The present disclosure is further described in the following examples with references to the drawings.

EXAMPLE 1

Figure 2:
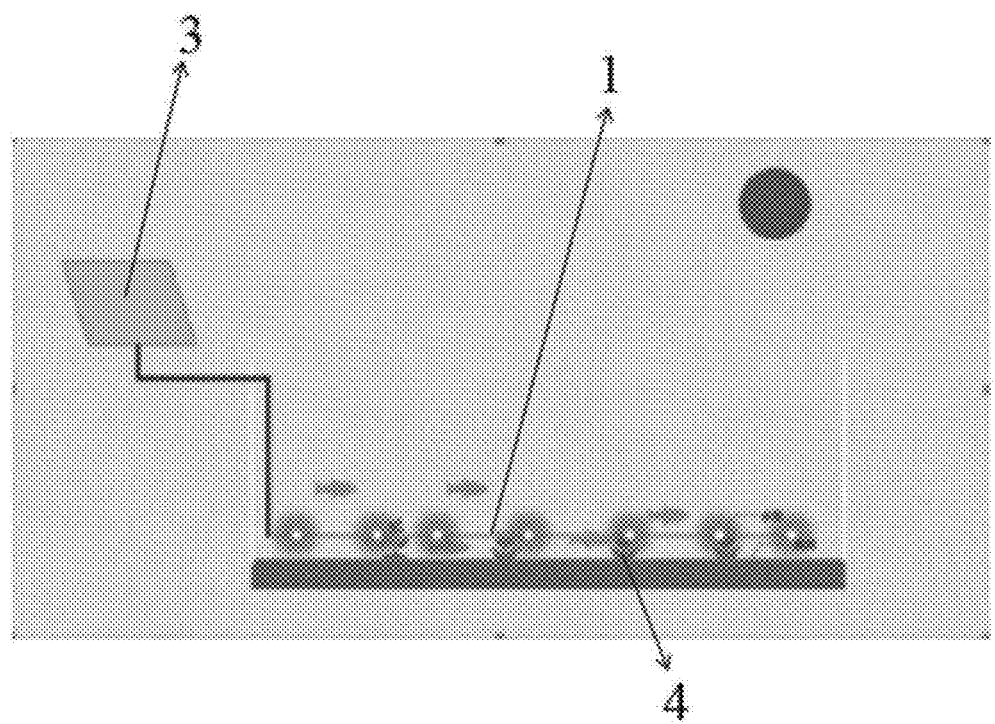
FIG. 2 is a schematic diagram of an ecosystem for deep water environment restoration according to an embodiment of the present disclosure.
Figure 3:
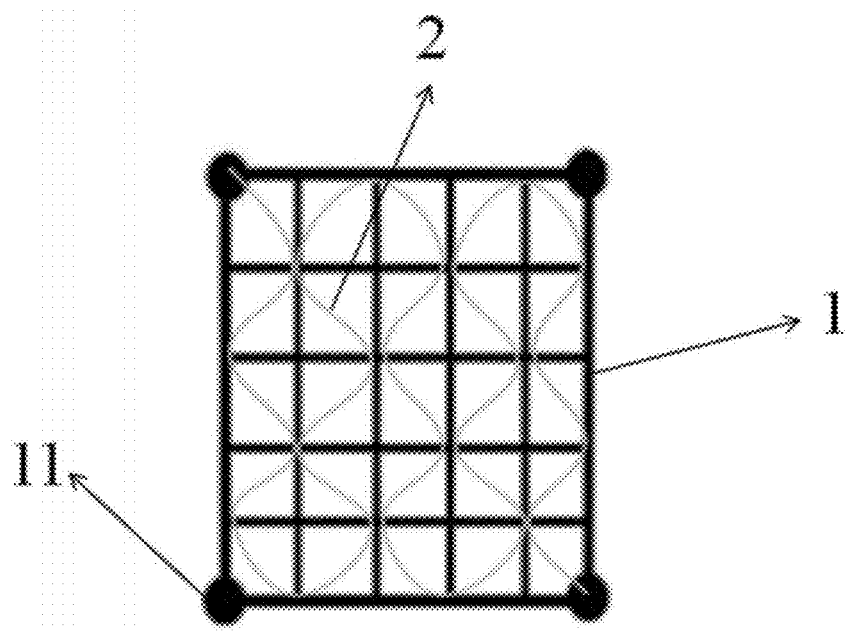
FIG. 3 is a schematic diagram of a photocatalytic bionic net according to an embodiment of the present disclosure.

An ecosystem for deep water environment restoration is provided as shown in FIG. 2 and FIG. 3. The ecosystem includes a photocatalytic bionic net 1, an underwater lighting system (being an LED light strip 2 as shown in FIG. 3), and an aquatic plant 4. The underwater lighting system is connected with a light-collecting device (being a solar photovoltaic panel 3). A method for constructing the ecosystem includes the following operations.

In operation (i), a floating object, such as plants, animal remains and rubbish, is cleaned up.

In operation (ii), a photocatalytic material is compounded with a fiber to obtain a photocatalytic bionic rope, and the photocatalytic bionic rope is woven to form the photocatalytic bionic net 1 (as shown in FIG. 3). The photocatalytic bionic net 1 has four corners, and each corner is provided with a load balancer 11. The load balancer 11 has an adjustable weight, such that the photocatalytic bionic net 1 can be located in any depth of the water body. For example, as shown in FIG. 2, the photocatalytic bionic net 1 is in the deep water level and is close to the bottom of the water body.

The photocatalytic material is a composite material of mesoporous graphene and a mesoporous photocatalyst. The composite material is prepared as shown in FIG. 1.

Metatitanic acid and sulfuric acid are mixed to prepare the titanyl sulfate solution. In this operation, a mass content of the metatitanic acid is in a range of 40% to 50% based on a mass of the titanyl sulfate solution, a molar mass ratio of metatitanic acid to sulfuric acid is in a range of 1:1 to 1:10, and a mixing time of metatitanic acid and sulfuric acid is in a range of 0.1 to 24 h. A reaction that takes place in this operation has a formula of $$H_2TiO_3 + H_2SO_4 \rightarrow TiOSO_4 + 2H_2O.$$
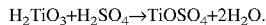

The titanyl sulfate solution and mesoporous graphene are mixed to prepare a mixture solution. In this operation, a mass ratio of titanyl sulfate to mesoporous graphene is in a range of 1:1 to 1:1000, and a mixing time of titanyl sulfate and mesoporous graphene is in a range of 0.1 to 24 h, a depth of a pore of graphene into which titanyl sulfate diffuses is in a range of 1-2 μm, a diffusion temperature of titanyl sulfate in mesoporous graphene is in a range of 80 to 400° C., a heating rate of the diffusion of titanyl sulfate in mesoporous graphene is in a range of 2-10° C./min, and a pressure of the diffusion of titanyl sulfate in mesoporous graphene is in a range of 0-30 bar. A reaction that takes place in this operation has a formula of TiOSO₄+mesoporous graphene→a composite of mesoporous graphene and titanyl sulfate.
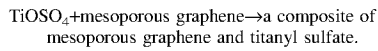

An alkaline substance is added into the mixture solution to prepare a precipitate of titanium hydroxide. In this operation, a mass ratio of the alkaline substance to titanyl sulfate is in a range of 1:1-1:10, and a mixing time of titanyl sulfate and alkaline material is in a range of 0.1-24 h. The alkaline substance includes ammonia, sodium hydroxide, and calcium hydroxide. Mesoporous graphene has a pore size ranging from 2 to 20 nm. A reaction that takes place in this operation has a formula of TiOSO₄+alkaline substance→TiO(OH)₂↓+sulfate.
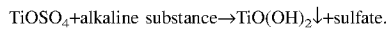

The precipitate is separated, washed, dried, and then calcined at a high temperature to obtain photocatalytic particles having a shell-core structure with a mesoporous graphene core and a mesoporous quantum titanium oxide shell. In this operation, a temperature of heating titanium hydroxide to produce mesoporous quantum titanium oxide (i.e., the self-assembly of titanium hydroxide) is in a range of 60 to 1200° C., and an annealing time of the self-assembly of titanium hydroxide to produce mesoporous quantum titanium oxide is in a range of 0.5-48 h, and thus the material having the porous core and mesoporous quantum titanium oxide shell is produced. The obtained material having the porous core and mesoporous quantum titanium oxide has a specific surface area of 200 to 300 m²/g, and a pore volume of 0.1 to 2 cm³/g. A reaction that takes place in this operation has a formula of $$TiO(OH)_2 \xrightarrow{\Delta} TiO2 + H_2O.$$
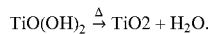

In operation (iii), the light collected on the surface is transmitted to the deep water layer and the bottom of the water body through bunching light-guiding rod 5 to provide light required by the photocatalytic bionic net 1. Aquatic plants are provided in the water body, for example, grow on the bottom of the water body.

By absorbing the light, the photocatalytic bionic net 1 performs the photocatalysis under water, to make the organic substances in the water body be degraded, and to make water split into oxygen, thus improving the growth of the underwater aquatic plants 4 and constructing a bionic diversity system.

Before using the ecosystem or the method of the present disclosure to treat the water body, a quality of the water body is tested as grade IV, and is lower than a target quality of grade III. The ammonia nitrogen index and the total phosphorus index exceed the standards. After the treatment of the present disclosure, the pollution indexes (such as dissolved oxygen, total phosphorus, COD, ammonia nitrogen and biochemical oxygen demand) meets Level III of "Environmental quality standards for surface water (GB3838-2002)".

EXAMPLE 2

Figure 4:
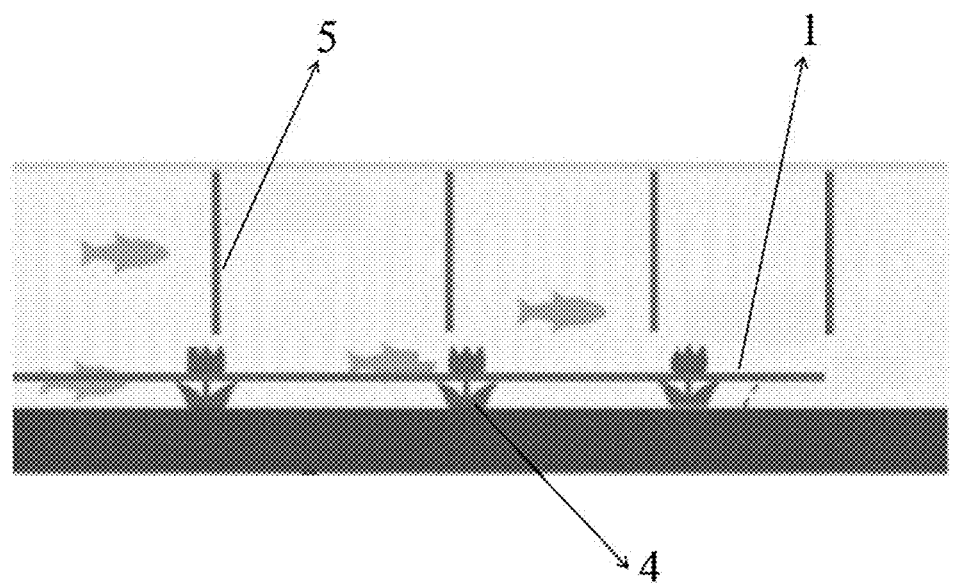
FIG. 4 is a schematic diagram of an ecosystem for deep water environment restoration according to an embodiment of the present disclosure.

An ecosystem for deep water environment restoration is provided as shown in FIG. 4 (where the underwater lighting system is a group of bunching light-guiding rods 5 arranged vertically in the water body and in a preset interval), and is constructed in the following operations.

In operation (i), a floating object, such as plants, animal remains and rubbish, is cleaned up.

In operation (ii), a composite material of mesoporous graphene and a mesoporous photocatalyst is compounded with a fiber to obtain a photocatalytic bionic rope, and the photocatalytic bionic rope is woven to form the photocatalytic bionic net 1. The photocatalytic bionic net 1 is wrapped with an LED light strip 2. Each of four corners of the photocatalytic bionic net 1 is provided with a load balancer 11 to make the photocatalytic bionic net 1 at the deep water layer of the water body.

In operation (iii), light collected by a solar photovoltaic panel 3 is converted into an electrical energy to power the bunching light-guiding rods 5, and the bunching light-guiding rods 5 emit the light. Aquatic plants are provided in the water body, for example, grow on the bottom of the water body.

By collecting the light and transmitting the light into the deep water layer, the photocatalytic bionic net 1 performs the photocatalysis under water, to make the organic substances in the water body be degraded, and to make water split into oxygen, thus improving the growth of the underwater aquatic plants 4 and constructing a bionic diversity system.

Before using the ecosystem or the method of the present disclosure to treat the water body, a quality of the water body is tested as grade IV, and is lower than a target quality of grade III. The ammonia nitrogen index and the total phosphorus index exceed the standards. After the treatment of the present disclosure, the pollution indexes (such as dissolved oxygen, total phosphorus, COD, ammonia nitrogen and biochemical oxygen demand) meets Level III of "Environmental quality standards for surface water (GB3838-2002)".

In an optional embodiment, a conductive carbon electrode material is added to the photocatalytic bionic rope, and a voltage is generated by the electric energy for adsorption. The photocatalytic bionic rope coated by the conductive carbon electrode material is prepared in the following operations.

The conductive carbon electrode material is mixed with an adhesive to obtain a conductive carbon electrode material slurry. In this operation, the conductive carbon electrode material has a size of 10 to 1000 nm. The adhesive is polyacrylate. A mass ratio of the conductive carbon electrode material to the adhesive is in a range of (1-100):(1-100). The conductive carbon electrode material is selected from graphene, conductive carbon black, carbon nanotubes, carbon quantum dots, activated carbon, conductive graphite, a conductive metal organic framework, gold nanopowders, silver nanopowders, copper nanopowders, and any combinations thereof.

The photocatalytic bionic rope is immersed into the conductive carbon electrode material slurry and stirred mechanically for 1 to 24 h.

Drying treatment is performed in an air atmosphere. In this operation, a drying time is in a range of 1 to 24 h, and a drying temperature is in a range of 50 to 90° C. The photocatalytic bionic rope material coated with the conductive carbon electrode material is prepared.

Reference throughout this specification to "an embodiment," "some embodiments," "an example," or "some examples," means that a particular feature, structure, material, or characteristic described in connection with the embodiment or example is included in at least one embodiment or example of the present disclosure. Thus, the appearances of the phrases such as "in an embodiment," "in some embodiments," "in an example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although some embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. An ecosystem for deep water environment restoration, comprising:
   a light-collecting device, configured to collect light and transmit the collected light to a deep water layer of a water body to supply the collected light to an underwater lighting system;
   the underwater lighting system connected to the light-collecting device and configured to provide light collected by the light-collecting device to the deep water layer;
   a photocatalytic bionic net comprising a photocatalytic material and a fiber and placed in the deep water layer, wherein the photocatalytic bionic net is interwoven by a photocatalytic bionic rope, the photocatalytic bionic rope comprises the photocatalytic material and the fiber, and the photocatalytic material is coated on a surface of the fiber to form the photocatalytic bionic net; and
   an aquatic plant in the deep water layer, wherein the aquatic plant comprises at least one selected from vallisneria, polygonaceae, bengal waterdropwort herb, hydrilla, mimulicalyx, lotus, *Zantedeschia hybrida*, *Potamogeton pectinatus*, *Potamogeton malaianus*, ottelia, orchid, *Cyperus altrnlifolius*, iris and any combination thereof;
   wherein:
   when the photocatalytic material receives the light, the photocatalytic material is able to;
   adsorb organic pollutants of the water body to the photocatalytic bionic net and catalyze degradation of the organic pollutants of the water body,
   concentrate microorganisms to allow the microorganisms to decompose the organic pollutants into nutrients required for growth of the aquatic plant, wherein the microorganisms comprise aerobic microorganisms and facultative microorganisms, and
   absorb the light to catalyze decomposition of water to produce oxygen; and
   when the aquatic plant receives the light, the aquatic plant is able to perform photosynthesis to release oxygen.

2. The ecosystem according to claim 1, wherein the photocatalytic bionic net comprises a first photocatalytic bionic net placed in the deep water layer and a second photocatalytic bionic net placed on a surface of the water body.

3. The ecosystem according to claim 1, wherein the light-collecting device is a solar panel and is configured to convert the light into an electric energy for the underwater lighting system.

4. The ecosystem according to claim 1, wherein the underwater lighting system is an LED light strip and is arranged, in a winding manner, on the photocatalytic bionic net.

5. The ecosystem according to claim 1, wherein the underwater lighting system is a bunching light-guiding rod.

6. The ecosystem according to claim 5, wherein the bunching light-guiding rod comprises a plurality of rods spaced apart from each other.

7. The ecosystem according to claim 1, wherein the photocatalytic bionic net is provided with a load balancer to arrange the photocatalytic bionic net to a preset level of the water body.

8. The ecosystem according to claim 1, wherein the photocatalytic material is able to adsorb a light with a wave length of 200 to 1200 nm.

9. The ecosystem according to claim 1, wherein the photocatalytic material comprises at least one selected from a composite material of mesoporous graphene and a mesoporous photocatalyst, mesoporous titanium dioxide, a composite material of mesoporous titanium dioxide and graphene, a composite material of mesoporous titanium dioxide and graphitic carbon nitride, a composite material of mesoporous titanium dioxide and a molecular sieve, a composite material of mesoporous titanium dioxide and an organic metal framework material, a composite material of mesoporous titanium dioxide and zinc oxide, a composite material of mesoporous titanium dioxide and iron trioxide, a composite material of mesoporous titanium dioxide and molybdenum disulfide, a composite material of mesoporous titanium dioxide and silver nitrate, a composite material of mesoporous titanium dioxide and a bismuth-based photocatalyst, a composite material of mesoporous titanium dioxide and tungsten oxide, a composite material of mesoporous titanium dioxide and tin oxide, a composite material of mesoporous titanium dioxide and cadmium sulfide, a composite material of mesoporous titanium dioxide and zirconium dioxide, metal-doped mesoporous titanium dioxide, titanium dioxide self-doped by oxygen vacancies, a composite material of mesoporous titanium oxide and a photocatalyst self-doped by oxygen vacancies, and titanium oxide self-doped by titanous.

10. The ecosystem according to claim 1, wherein the photocatalytic material is titanium dioxide, a composite material of titanium dioxide and graphene, a composite material of titanium dioxide and a molecular sieve, or any combination thereof.

11. The ecosystem according to claim 1, wherein the photocatalytic bionic net further comprises a conductive carbon electrode material.

12. The ecosystem according to claim 11, wherein the conductive carbon electrode material comprises at least one selected from graphene, conductive carbon black, carbon nanotube, carbon quantum dots, activated carbon, conductive graphite, conductive metal organic framework, gold nanopowder, silver nanopowder, copper nanopowder and any combinations thereof.

13. A method for constructing the ecosystem for deep water environment restoration according to claim 1, comprising:
    cleaning up a floating object on a surface of a water body;
    providing a light-collecting device and an underwater lighting system connected to the light-collecting device and configured to provide light to a deep water layer of the water body;
    placing a photocatalytic bionic net comprising a photocatalytic material and a fiber in the deep water layer; and
    growing an aquatic plant in the water body;
    wherein
        when the photocatalytic material receives the light, the photocatalytic material is able to
            adsorb organic pollutants of the water body to the photocatalytic bionic net and catalyze degradation of the organic pollutants of the water body,
            concentrate microorganisms to allow the microorganisms to decompose the organic pollutants into nutrients required for growth of the aquatic plant, and
            absorb the light to catalyze decomposition of water to produce oxygen; and
        when the aquatic plant receives the light, the aquatic plant is able to perform photosynthesis to release oxygen.

14. The method according to claim 13, wherein the photocatalytic material is a composite material of graphene and titanium dioxide, and is prepared by:
    mixing metatitanic acid and sulfuric acid to prepare a titanyl sulfate solution;
    mixing the titanyl sulfate solution and graphene to prepare a mixture solution;
    adding an alkaline substance into the mixture solution to prepare a precipitate of titanium hydroxide;
    washing and drying the precipitate and heating the precipitate to obtain photocatalytic particles having a shell-core structure with a graphene core and a titanium dioxide shell as the photocatalytic material.

15. The method according to claim 14, wherein a mass content of the metatitanic acid in the titanyl sulfate solution is in a range of 40% to 50%, or a mass ratio of metatitanic acid to sulfuric acid is in a range of 1:1 to 1:10.

16. The method according to claim 14, wherein a mass ratio of titanyl sulfate to graphene is in a range of 1:1 to 1:1000.

17. The method according to claim 14, wherein the alkaline substance comprises at least one selected from ammonia, sodium hydroxide, and calcium hydroxide, and a mass ratio of the alkaline substance to titanyl sulfate is in a range of 1:1 to 1:10.

18. The method according to claim 13, wherein the photocatalytic bionic net is prepared by:
    providing a fiber rope, and compounding the photocatalytic material with the fiber rope to obtain a photocatalytic bionic rope, and
    weaving the photocatalytic bionic net by the photocatalytic bionic rope.

19. The method according to claim 18, wherein the photocatalytic bionic net is added with a conductive carbon electrode material by:
    mixing the conductive carbon electrode material with an adhesive to prepare a conductive carbon electrode material slurry;
    mixing the photocatalytic bionic rope and the conductive carbon electrode material slurry under mechanical stirring for 1 to 24 h; and
    drying the photocatalytic bionic rope in an air atmosphere at a temperature of 50 to 90° C. for 1 to 24 h.

* * * * *